United States Patent [19]

Nakagawa et al.

[11] Patent Number: 4,920,372
[45] Date of Patent: Apr. 24, 1990

[54] CAMERA

[75] Inventors: Tadashi Nakagawa; Nobuo Shinozaki; Hiroyuki Koizumi; Hiroshi Yamazaki; Hiroyuki Saito; Katsuhiko Matsushita; Miyoshi Tanikawa, all of Chiba, Japan

[73] Assignee: Seikosha Co., Ltd., Tokyo, Japan

[21] Appl. No.: 376,722

[22] Filed: Jul. 7, 1989

[30] Foreign Application Priority Data

Jul. 11, 1988 [JP] Japan ................... 63-172188

[51] Int. Cl.$^5$ .......................... G03B 7/08; G03B 9/08
[52] U.S. Cl. .................... 354/412; 354/435; 354/443; 354/230; 354/233; 354/236; 354/441
[58] Field of Search ............. 354/412, 435, 443, 228, 354/230, 231, 233, 236, 441

[56] References Cited

U.S. PATENT DOCUMENTS

| | | | |
|---|---|---|---|
| 3,584,561 | 6/1971 | Starp | 354/236 X |
| 4,200,385 | 4/1980 | Shono | 354/236 X |
| 4,354,753 | 10/1982 | Tenne et al. | 354/236 X |
| 4,687,314 | 8/1987 | Raschke | 354/230 X |
| 4,841,327 | 6/1989 | Yamamoto et al. | 354/412 |

Primary Examiner—W. B. Perkey
Attorney, Agent, or Firm—Jordan and Hamburg

[57] ABSTRACT

A camera having a lens shutter and a focal-plane shutter, includes a selector circuit for selecting either a lens shutter mode or a focal-plane shutter mode; a first driving device for controlling either the programmed exposure value of the lens shutter or the size of the aperture, the first driving device including a motor and an actuating member driven by the motor, the actuating member including a peripheral surface with a first cam for controlling the programmed exposure value of the lens shutter in response to forward rotation of the motor, and a second cam for controlling the size of the aperture in response to reverse rotation of the motor, the first cam having an inclination in a first direction and the second cam having a less steep inclination in an opposite direction; a pivotally mounted opening lever connecting the lens shutter to the actuating member, the lever defining a first arm and a second arm, the first arm in engagement with the actuating member and the second arm connected with the lens shutter, a first pin on the first arm which rides on the cams, and a second pin on the second arm to pivotally connect with shutter blades of the lens shutter; a spring biasing the first pin into engagement with the cams; a second driving device controlling the time of operation of the focal-plane shutter mode; and a sequential control circuit controlling the driving devices.

21 Claims, 5 Drawing Sheets

FIG. 8
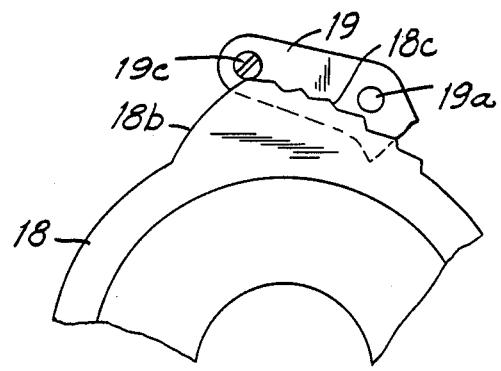
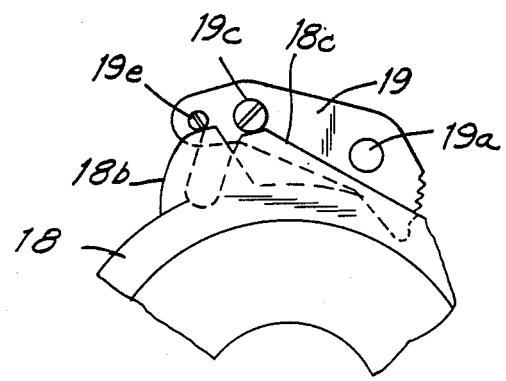
FIG. 9

CAMERA

BACKGROUND OF THE INVENTION

The present invention relates to a camera equipped with both a lens shutter and a focal-plane shutter.

Cameras equipped with a lens shutter and cameras equipped with a focal-plane shutter are well known.

A camera equipped with a lens shutter is adapted for flash photography because of the shape of the shutter opening. On the other hand, the lens of a camera equipped with a focal-plane shutter can be replaced because of the light-blocking structure. Also, the latter camera permits high-speed time control because of the manner of operation.

In an attempt to utilize the features of the aforementioned types of cameras, it has been proposed to use an interchangeable lens having a lens shutter with a camera equipped with a focal-plane shutter.

However, the shutter operates alone only in an interchangeable lens. The camera has separate control portions for the focal-plane shutter and the lens shutter, respectively. Therefore, the controls are duplicative and wasteful.

In order to solve the foregoing problems, the present applicant has already proposed a camera system equipped with both a lens shutter and a focal-plane shutter (Japanese Patent Application No. 172188/1988).

SUMMARY OF THE INVENTION

It is an object of the present invention to provide a camera with a lens shutter which is an improvement over the abovedescribed camera and which operates accurately and efficiently.

The above object is achieved in accordance with the teachings of the invention by a camera having a lens shutter for performing a programmed exposure operation and a diaphragm-adjusting operation and a focal-plane shutter, the camera including selector means for selecting either a lens shutter mode in which the lens shutter is operated as a programmed shutter or a focal-plane shutter mode in which the shutter speed is controlled by the focal-plane shutter and the aperture is controlled by the lens shutter, respectively; first driving means including an electric motor for controlling either the programmed exposure value of the lens shutter and/or the aperture value; an actuating member which is driven by the motor and has a first cam controlling the programmed exposure value in response to forward reciprocating rotation of the motor and a second cam controlling the aperture value in response to reverse reciprocating rotation of the motor; second driving means controlling the time for which the focal-plane shutter is operated; and sequential control means controlling the timing at which the first and second driving means are operated.

BRIEF DESCRIPTION OF THE DRAWINGS

FIGS. 7, 8 and 9 are plan views of the main portions of shutter assemblies according to three different embodiments of the present invention.

DESCRIPTION OF THE PREFERRED EMBODIMENTS

Figure 1:
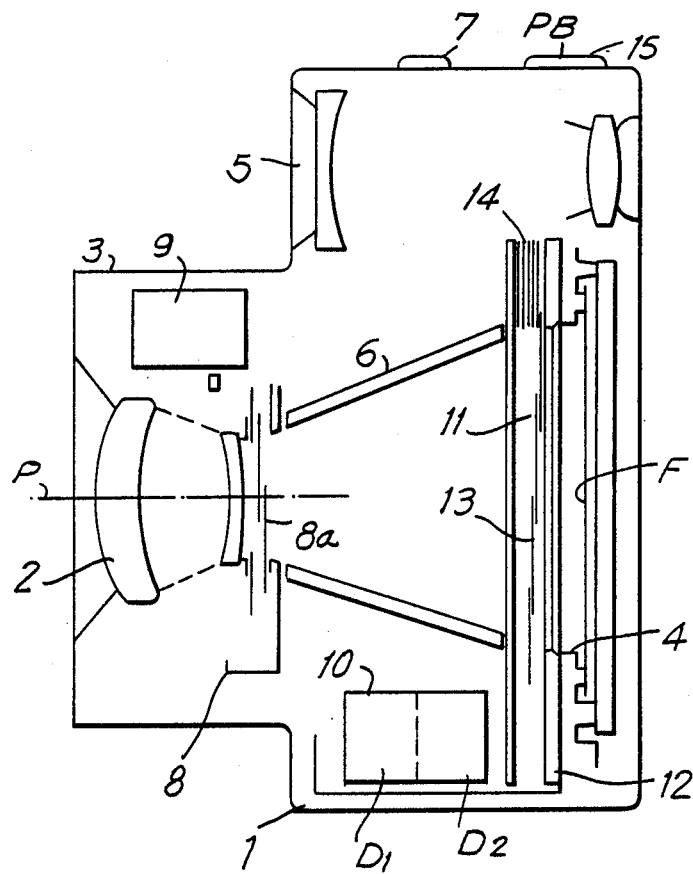
FIG. 1 is a schematic cross-sectional view of a camera according to one embodiment of the present invention.

Referring to the drawings in detail and initially to FIG. 1, a camera according to one embodiment of the invention includes a lens 2 held to a lens barrel 3 and mounted to the body 1 of the camera. An image of a subject passed through lens 2 is focused onto a photosensitive material F (hereinafter referred to as the film) received behind the limits of the field of view 4.

A viewfinder 5 defining the field of view is mounted at the upper portion of camera body 1. Also, a shade cylinder 6 which shields the film against deleterious light coming from portions of the camera other than lens 2 is mounted at a front portion of camera body 1. A shutter release button 7 for operating the camera is mounted on the upper surface of camera body 1.

A lens shutter 8 for opening and closing the lens opening is disposed behind lens 2. Lens shutter 8 has blades 8a which usually close the lens opening and which define the lens opening in the open condition thereof. Blades 8a can also function as a diaphragm, as will be apparent from the description which follows.

A stepper motor 9 is disposed inside lens barrel 3 and activates shutter blades 8a in response to an output signal from a first driving means D1. An electronic circuit 10 that controls stepper motor 9 comprises first driving means D1, a sequential control circuit SC controlling the timing at which lens shutter 8 and the focal-plane shutter (described later) are operated, a photometric circuit, and a second driving means D2 (described later). The photometric circuit includes photocells for measuring the brightness of the subject. Since all of these components are well known, they are not described in detail herein.

A focal-plane shutter 11 comprises a first blind 13 and a second blind 14, both of which are held to a base 12 mounted to camera body 1. When two electromagnets (not shown) are successively energized by second driving means D2 of the known electronic circuit 10, the blinds operate at a desired interval to control the exposure time.

Focal-plane shutter 11 is cocked by a known method when the film is fed. When a multiple exposure operation is performed, focal-plane shutter 11 is cocked independent of the transport of the film.

A selector means 15 includes a pushbutton PB mounted on top of camera body 1 to determine whether focal-plane shutter 11 or lens shutter 8 is to be used in taking a photograph.

Figure 2:
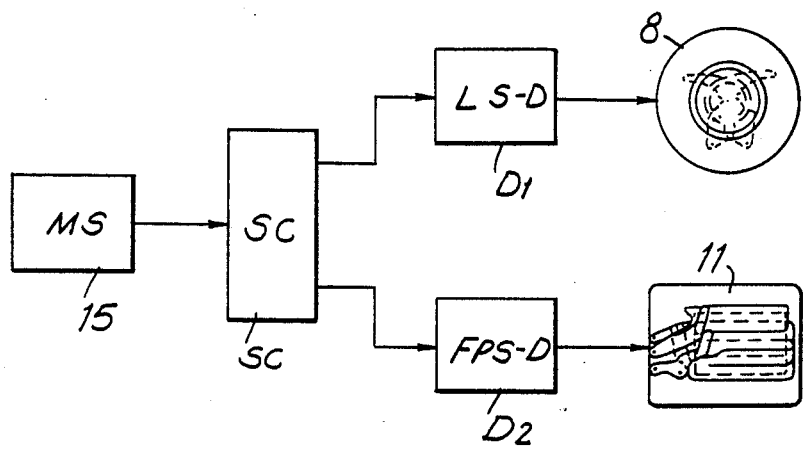
FIG. 2 is a block diagram of a portion of the camera of FIG. 1, used for illustrating the operation of the camera.

FIG. 2 is a block diagram illustrating the operation of the above structure. Selector means 15 further includes a selector circuit MS which determines whether focal-plane shutter 11 or lens shutter 8 is to be activated, in response to activation of pushbutton PB. In response to the signal from selector circuit MS, sequential control circuit SC drives first driving means D1 and second driving means D2 at predetermined timing to activate focal-plane shutter 11 and lens shutter 8.

Figure 3:
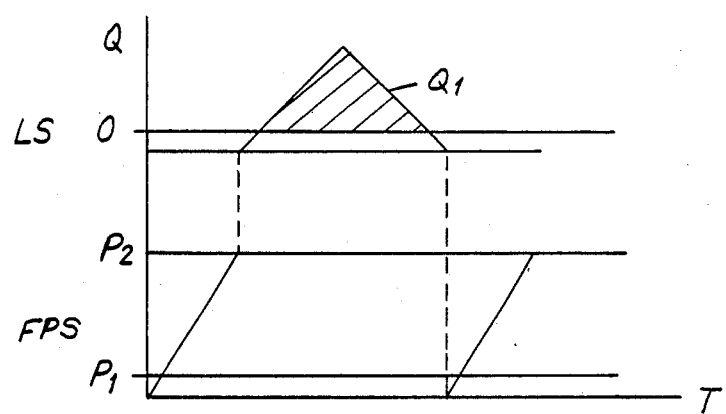
FIGS. 3 and 4 are waveform diagrams illustrating the operation of the camera in a lens shutter mode and focal-plane shutter mode, respectively.
Figure 4:
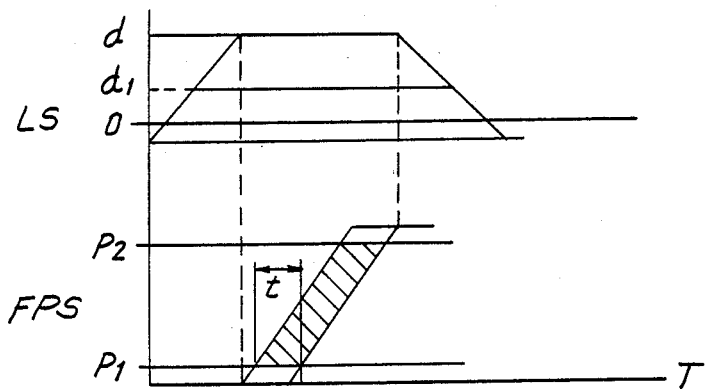

The manner in which the shutters are activated is next described by referring to FIGS. 3 and 4. In each of these Figures, the exposure value on the field of view 4 or the position of the field of view is plotted against the elapsed time.

FIG. 3 is a diagram illustrating the operation in which the lens shutter mode is established by selector means 15. In this mode, the exposure operation is performed by lens shutter 8. When shutter release button 7 shown in FIG. 1 is depressed for photography, sequential control circuit SC first causes second driving means D2 to produce an output signal. This moves first blind 13 of focal-plane shutter 11 from one end P1 of the field of view 4 to the other end P2, to open the field of view 4.

Then, sequential control circuit SC instructs first driving means D1 to deliver an output signal for activating lens shutter 8. The film F is exposed with a light amount corresponding to a region Q1. At this time, lens shutter 8 performs a programmed exposure operation in which the aperture (lens opening) size and the timing are combined according to the brightness of the subject.

Subsequently, sequential control circuit SC causes second driving means D2 to produce an output signal. As a result, second blind 14 of focal-plane shutter 11 is moved from one end P1 to the other end P2, thus closing the field of view 4.

Upon completion of the operation of focal-plane shutter 11, sequential control circuit SC produces an output signal to wind up film F until the next frame appears. Also, sequential control circuit SC drives the motor (not shown) to cock focal-plane shutter 11

By these operations, the photography in the lens shutter mode is completed.

FIG. 4 is a diagram illustrating the operation in which the focal-plane shutter mode is established by selector means 15. In this mode, the exposure operation is performed by focal-plane shutter 11.

When shutter release button 7 shown in FIG. 1 is depressed to take photographs, sequential control circuit SC first causes first driving means D1 to deliver an output signal, which opens lens shutter 8 to a desired aperture d1. Thus, the lens opening is opened.

Then, sequential control circuit SC orders second driving means D2 to produce an output signal so that first blind 13 and second blind 14 of focal-plane shutter 11 are successively activated to expose film F. At this time, blinds 13 and 14 operate at an interval t which provides an appropriate amount of exposure together with the aperture value d1 of lens shutter 8, according to the brightness of the subject.

Thereafter, sequential control circuit SC causes first driving means D1 to produce an output signal to close lens shutter 8.

Upon completion of the operation of lens shutter 8, sequential control circuit SC delivers an output signal to wind up film F until the next frame appears. At the same time, it drives the motor (not shown) to cock focal-plane shutter 11.

By these operations, the photography in the focal-plane shutter mode is completed.

Figure 5:
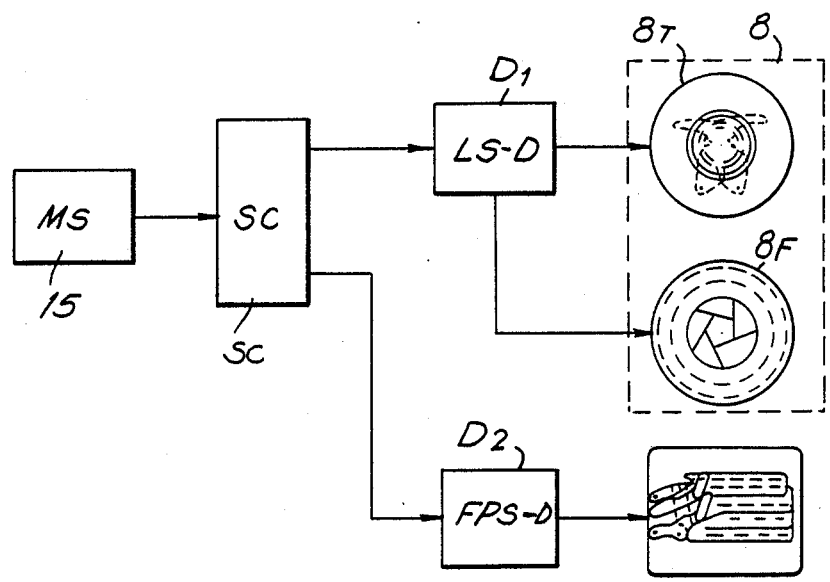
FIG. 5 is a diagram similar to FIG. 2, but showing another embodiment of the invention.
Figure 6:
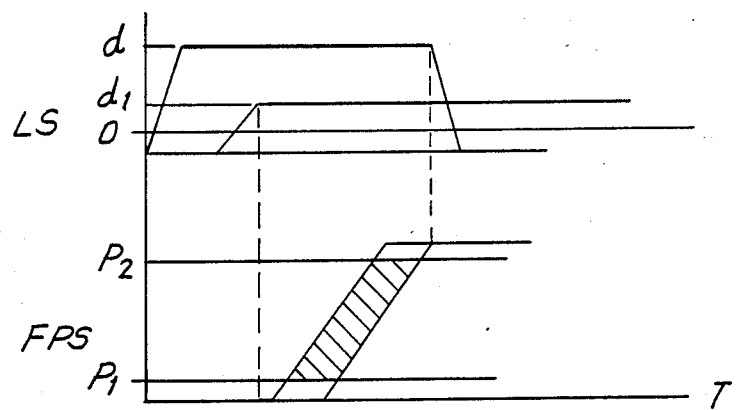
FIG. 6. is a waveform diagram illustrating the operation of the camera shown in FIG. 5.

FIG. 5 is a block diagram of the mode of operation illustrated in FIG. 4, and in which blades are mounted in a diaphragm device 8F to achieve the aperture value d1. FIG. 6 is a diagram illustrating the operation.

Specifically, in the example illustrated in FIG. 5, sequential control circuit SC causes first driving means D1 to fully open shutter blades 8T to the value of d and diaphragm device 8F is so operated that the given aperture value d1 is established.

The lens shutter 8 shown in FIG. 3 can be replaced with the lens shutter shown in FIG. 6 with similar utility.

Figure 7:
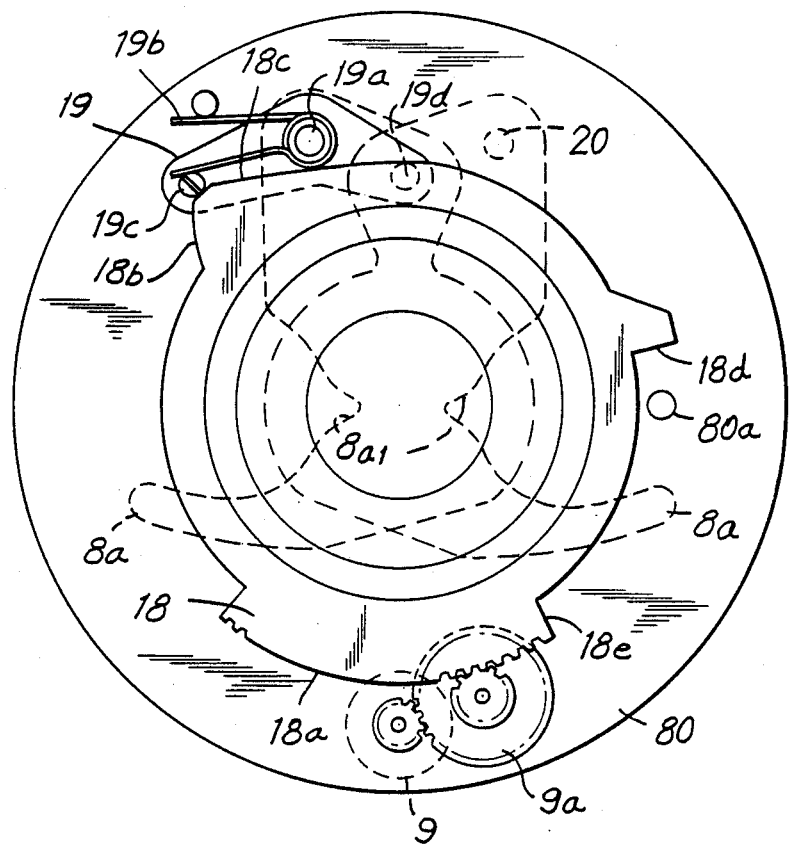

FIG. 7 shows main portions of lens shutter 8 according to the invention. Lens shutter 8 has a base 80 on which components are disposed.

More specifically, an actuating member 18 has teeth 18a in mesh with an idler gear 9a which, in turn, is driven by stepper motor 9. Stepper motor 9 rotates actuating member 18 around the lens or shutter opening. Actuating member 18 has a first cam 18b controlling the programmed exposure value of the shutter, a second cam 18c controlling the aperture value, and end portions 18d and 18e. These end portions 18d and 18e engage with a fixed pin 80a to limit the range of angular movement of actuating member 18.

An opening lever 19 is rotatably held to a shaft 19a and a spring 19b urges lever 19 to the left. Opening lever 19 has a pin 19c engaging with cams 18b and 18c of actuating member 18 and a pin 19d protruding downward, pin 19d engaging with shutter blades 8a.

Shutter blades 8a are so held that they can rotate around the downwardly protruding portion of shaft 19a and around a shaft 20. Usually, shutter blades 8a are in the illustrated position and close the shutter opening. The blades are activated by pin 19d. As is well known in the art, shutter blades 8a have a fringe portion 8a1 acting also as a diaphragm.

The manner in which lens shutter 8 shown in FIG. 7 operates in the lens shutter mode is next described. First, first driving means D1 rotates stepper motor 9 in a forward direction. In the illustrated example, stepper motor 9 is rotated to the right, whereby actuating member 18 rotates to the right (CW) at a constant velocity around the shutter opening. At this time, pin 19c follows first cam 18b and opening lever 19 is rotated to the left (CCW) by spring 19b. Accordingly, pin 19d activates shutter blades 8a. In such case, fringe portions 8a1 also serve as the diaphragm. Thus, the shutter opening is gradually opened. During this process, when a known photometric circuit 101 senses that the time set for the exposure value (Q1 in FIG. 3) appropriate for the subject has elapsed, sequential control means SC causes first driving means D1 to reverse stepper motor 9. Thus, actuating member 18 rotates to the left (CCW) so that first can 18b engages pin 19c upward to activate lever 19. Then, pin 19d drives shutter blades 8a to close the shutter opening. Thus, the programmed exposure operation is completed.

The manner in which lens shutter 8 operates in the focal-plane shutter mode is next described. The components are essentially identical in operation to the lens shutter mode described above and so the operation is not described in detail. In the focal-plane shutter mode, shutter blades 8a provide the aperture d1 shown in FIG. 4. Only the method of providing this aperture is next described.

In particular, sequential control means SC causes first driving means D1 to reverse stepper motor 9. Therefore, actuating member 18 turns to the left (CCW) and pin 19c follows second cam 18c so that opening lever 19 is rotated to the left (CCW). Then shutter blades 8a are rotated. The fringe portion 8a1 forms the given aperture size (d1 in FIG. 4). Then, stepper motor 9 comes to a halt. Subsequently, the process is the same as the process in the focal-plane shutter mode. Finally, stepper motor 9 rotates in a forward direction to close the shutter opening.

The profiles of first cam 18b and second cam 18c of actuating member 18 are now described.

Since first cam 18b corresponds to a programmed exposure, shutter blades 8a are operated so that the aperture (lens opening) is formed corresponding to the combination of the exposure and the elapsed time. For this purpose, first cam 18b is designed to shift pin 19c a long distance per unit angular movement of actuating member 18.

Meanwhile, second cam 18c corresponds to the aperture size d1. Thus, stepper motor 9 provides the aperture value d1 and then comes to a halt. The amount of movement of shutter blades 8a is determined according to the angular position of the stopped motor. Second cam 18c is designed to shift pin 19c a short distance per unit angular movement of actuating member 18.

In other words, the inclined surface of second cam 18c is less steep than the inclined surface of first cam 18b.

FIG. 8 shows a second embodiment of first cam 18b and second cam 18c. As shown, second cam 18c has portions lying on circles drawn about the center of rotation, corresponding to the aperture value d1. Consequently, if an error of the angular position of stepper motor 9 and errors associated with other components build up, the aperture value is not affected.

FIG. 9 shows a third embodiment of first cam 18b and second cam 18c. Pins 19e and 19c activated by first cam 18b and second cam 18c, respectively, are mounted on opening lever 19. The pins are somewhat loosely coupled so as to be rotatable. Further, the portion coupled to opening lever 19 and the portions coupled to the cams are eccentric.

Hence, pins 19c and 19e can be adjusted separately. Adjustment of one of the pins does not affect the adjustment of the other.

In the case shown in FIG. 6, a second cam differing in shape from actuating member 18 may be formed on diaphragm device 8F. In such case, shutter blades 8a are opened so that diaphragm device 8F may provide the aperture value.

In the above example, although stepper motor 9 has been used, it can be replaced with another motor, such as an ultrasonic motor or DC motor, as long as it can be reversed.

Based on the inventive concept, suitable cams may be formed on actuating member 18 of a single-lens reflex camera. The shutter blades 8a which are normally open are once closed. Then, an exposure operation may be performed.

As can be understood from the above description, the first and second cams are formed on actuating member 18. This permits the programmed exposure value and the aperture value to be accurately controlled. Hence, the invention is quite useful.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. A camera having a lens shutter for performing a programmed exposure operation and a diaphragm-adjusting operation, and a focal-plane shutter, said camera comprising:
   (a) selector means for selecting one of the following modes of operation:
     (i) a lens shutter mode in which the lens shutter is operated as a programmed shutter, and
     (ii) a focal-plane shutter mode in which the shutter speed is controlled by the focal-plane shutter and an aperture is controlled by the lens shutter;
   (b) first driving means for controlling one of the following:
     (i) a programmed exposure value of the lens shutter, and
     (ii) the size of said aperture;
   (c) said first driving means including:
     (i) a motor, and
     (ii) an actuating member driven by said motor, said actuating member having first cam means for controlling the programmed exposure value of the lens shutter in response to rotation of the motor in a first direction, and second cam means for controlling the size of the aperture in response to rotation of the motor in a second, opposite direction;
   (d) second driving means for controlling the time in which the focal-plane shutter mode is operated; and
   (e) sequential control means for controlling said first and second driving means.

2. A camera according to claim 1, wherein said actuating member includes a ring member having said first and second cam means formed on a peripheral surface thereof, said first cam means having an inclination in a first direction and said second cam means having an inclination in a second, opposite direction.

3. A camera according to claim 2, wherein said first cam means has a steeper inclination than said second cam means.

4. A camera according to claim 2, wherein said first cam mean is formed as a first ramp surface and said second cam means is formed as a second ramp surface, such that upper ends of said first and second ramp surfaces are connected with each other.

5. A camera according to claim 1, further including opening lever means for connecting said lens shutter to said actuating member, said lever means being pivotally connected to a base so as to define a first lever arm and a second lever arm, said first lever arm being in engagement with said actuating member and said second lever arm being connected with said lens shutter.

6. A camera according to claim 5, further including spring means for biasing said first lever arm into engagement with said actuating member.

7. A camera according to claim 6, wherein said first lever arm includes a pin biased by said spring means to ride on said first and second cam means, and said second lever arm includes a pin pivotally connected with shutter blades of said lens shutter.

8. A camera according to claim 1, wherein said actuating member includes a rotatable ring member having a peripheral edge with teeth along a portion thereof, and said motor is engaged with said teeth to rotate said ring member.

9. A camera according to claim 8, further including a gear in meshing engagement between the teeth of said actuating member and said motor, such that said motor is indirectly engaged with said teeth.

10. A camera according to claim 1, wherein said actuating member includes a rotatable ring member having two stop edges spaced along the peripheral edge thereof, and further including pin means positioned adjacent to the peripheral edge between said stop edges for limiting rotational movement of said rotatable ring member.

11. A camera according to claim 1, wherein said second cam means includes a cam surface having portions thereof lying on concentric circles.

12. A camera according to claim 1, further including opening lever means for connecting said lens shutter to said actuating member, said lever means being pivotally connected to a base so as to define a first lever arm and a second lever arm, said first lever arm being in engagement with said actuating member and said second lever arm being connected with said lens shutter, and a first pin on said first lever arm for engagement with said first cam means and a second pin on said first lever arm for engagement with said second cam means.

13. A camera according to claim 12, wherein said first and second cam means are eccentric with respect to each other, and said first and second pins are also eccentric with respect to each other.

14. A camera having a lens shutter for performing a programmed exposure operation and a diaphragm-adjusting operation and a focal-plane shutter, said camera comprising:
(a) selector means for selecting one of the following modes of operation:
   (i) a lens shutter mode in which the lens shutter is operated as a programmed shutter, and
   (ii) a focal-plane shutter mode in which the shutter speed is controlled by the focal-plane shutter and an aperture is controlled by the lens shutter;
(b) first driving means for controlling one of the following:
   (i) a programmed exposure value of the lens shutter, and
   (ii) the size of said aperture;
(c) said first driving means including:
   (i) a motor, and
   (ii) an actuating member driven by said motor, said actuating member including a ring member having first cam means formed on a peripheral surface thereof for controlling the programmed exposure value of the lens shutter in response to rotation of the motor in a first direction, and second cam means formed on the peripheral surface thereof for controlling the size of the aperture in response to rotation of the motor in a second, opposite direction, said first cam means having an inclination in a first direction with a first steepness and said second cam means having an inclination in a second, opposite direction with a second, lesser steepness;
(d) opening lever means for connecting said lens shutter to said actuating member, said lever means being pivotally connected to a base so as to define a first lever arm and a second lever arm, said first lever arm being in engagement with said actuating member and said second lever arm being connected with said lens shutter, said first lever arm including pin means for riding on said first and second cam means, and said second lever arm includes pin pivotally connected with shutter blades of said lens shutter;
(e) spring means for biasing said pin into engagement with said first and second cam means;
(f) second driving means for controlling the time in which the focal-plane shutter mode is operated; and
(g) sequential control means for controlling said first and second driving means.

15. A camera according to claim 14, wherein said first cam means is formed as a first ramp surface and said second cam means is formed as a second ramp surface, such that upper ends of said first and second ramp surfaces are connected with each other.

16. A camera according to claim 14, wherein said actuating member includes a rotatable ring member having a peripheral edge with teeth along a portion thereof, and said motor is engaged with said teeth to rotate said ring member.

17. A camera according to claim 16, further including a gear in meshing engagement between the teeth of said actuating member and said motor, such that said motor is indirectly engaged with said teeth.

18. A camera according to claim 1, wherein said actuating member includes a rotatable ring member having two stop edges spaced along the peripheral edge thereof, and further including pin means positioned adjacent to the peripheral edge between said stop edges for limiting rotational movement of said rotatable ring member.

19. A camera according to claim 14, wherein said second cam means includes a cam surface having portions thereof lying on concentric circles drawn about a center of rotation of said aperture.

20. A camera according to claim 14, wherein said pin means includes a first pin on said first lever arm for engagement with said first cam means and a second pin on said first lever arm for engagement with said second cam means.

21. A camera according to claim 20, wherein said first and second cam means are eccentric with respect to each other, and said first and second pins are also eccentric with respect to each other.

* * * * *